O. STEINBORN.
THRESHING MACHINE.
APPLICATION FILED MAR. 4, 1920.
1,344,599.
Patented June 22, 1920.
2 SHEETS—SHEET 1.
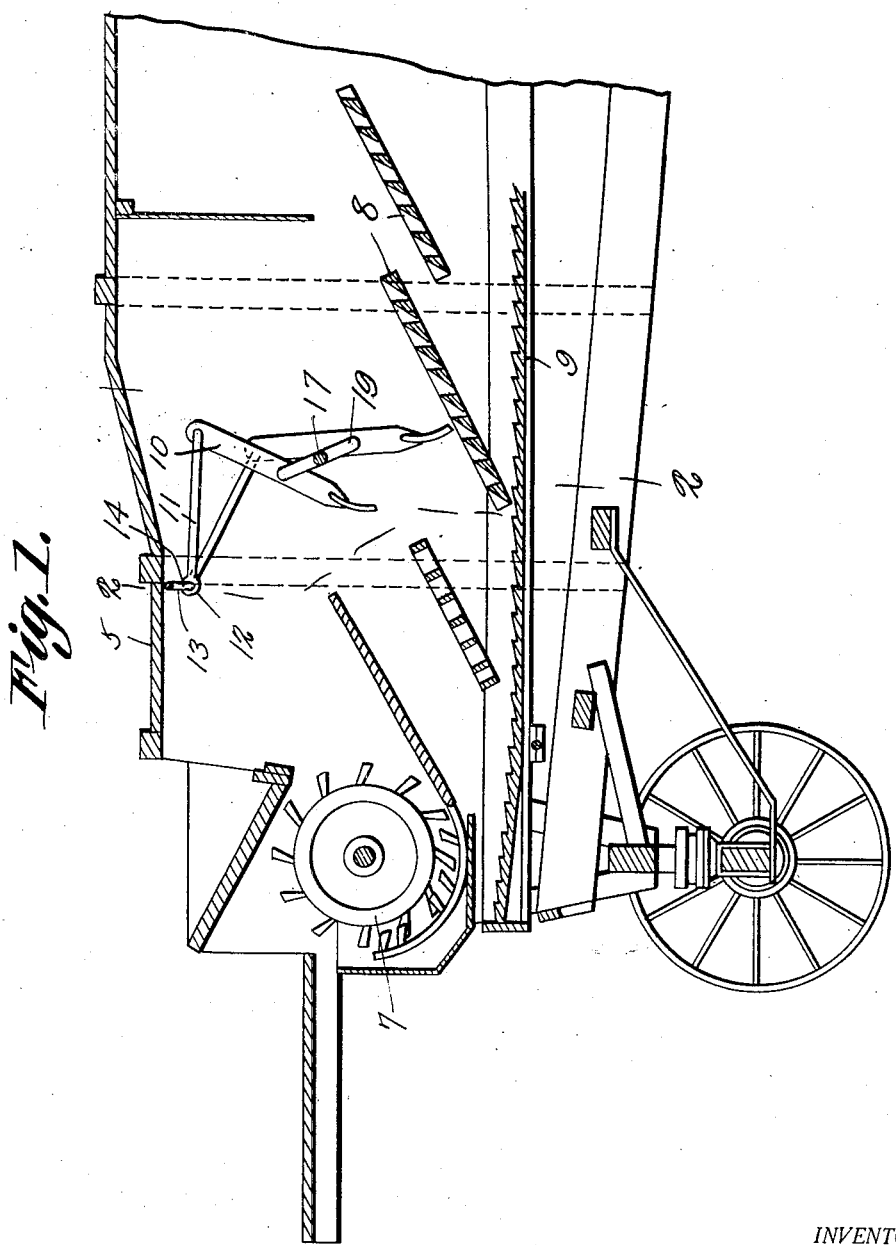
INVENTOR.
Otto Steinborn
BY
Frank A. Ahneman
ATTORNEY.

O. STEINBORN.
THRESHING MACHINE.
APPLICATION FILED MAR. 4, 1920.
1,344,599.
Patented June 22, 1920.
2 SHEETS—SHEET 2.
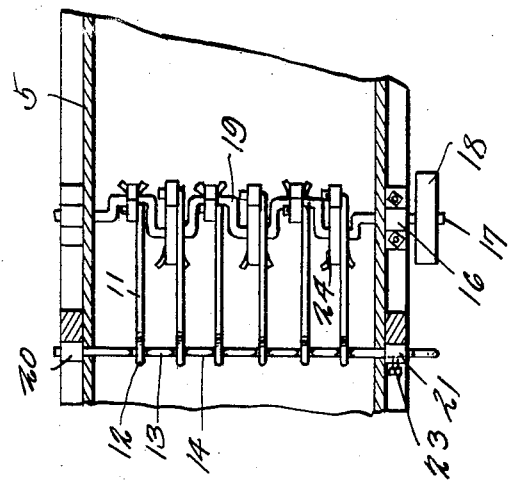
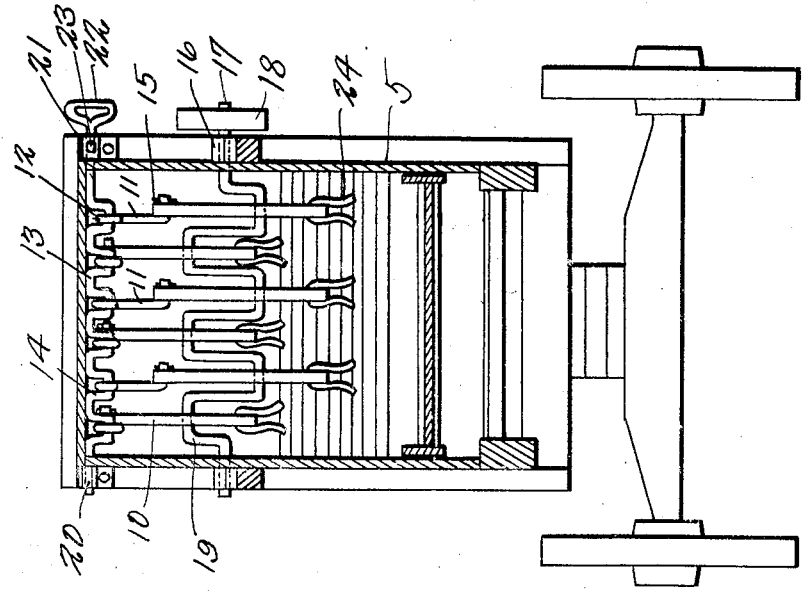
INVENTOR.
Otto Steinborn
BY
Frank A. Anneman
ATTORNEY.

UNITED STATES PATENT OFFICE.

OTTO STEINBORN, OF ARLINGTON, MINNESOTA.

THRESHING-MACHINE.

1,344,599. Specification of Letters Patent. Patented June 22, 1920.

Application filed March 4, 1920. Serial No. 363,319.

*To all whom it may concern:*

Be it known that I, OTTO STEINBORN, a citizen of the United States of America, and resident of Arlington, in the county of Sibley and State of Minnesota, have invented certain new and useful Improvements in Threshing-Machines, of which the following is a specification.

This invention has reference to threshing machines, and more particularly to the construction and operation of the forked arms employed for moving the straw therethrough.

The object of this invention is to provide novel means for supporting the forked members to permit the same to be adjusted with relation to the grate over which they operate, thus adapting the machine for use with grains of various weights.

With the foregoing and other objects in view, the invention consists in the details of construction and in the arrangement and combination of parts to be hereinafter more fully set forth and claimed.

In referring to the invention in detail, reference will be had to the accompanying drawings in which the preferred form of the invention is illustrated and in which—

Figure 1 illustrates a fragmental sectional view through a threshing machine, having the forked arms supported in accordance with the present invention;

Fig. 2 illustrates a sectional view taken on the line 2—2 of Fig. 1; and

Fig. 3 illustrates a detail view of the adjustable hangers.

In these drawings, the reference character 5 designates the body of the threshing machine, which is of the usual construction, the same having the usual cylinder 7, supported adjacent the forward end thereof, which cylinder is provided with the usual teeth for contacting with the straw for forcing the same from the machine.

Disposed within the body of the threshing machine, and supported in spaced relation with each other are the racks 8, which receive the bundles of grain that are fed to the threshing machine in the well known manner, which racks cause the grain to be separated from the straw, where the grain passes downwardly to the movable grain pan 9, which forces the grain to a suitable discharge spout not shown.

The forked arms 10 forming the subject matter of the present invention, are shown as having their upper ends connected to the connecting links 11, which in turn have one of their respective ends formed into an eye 12 adapted to embrace the cranks 13, formed in the adjustable crank arm 14, so that movement of the crank arm 14 will result in a relative movement of the links 11 to cause an adjustment of the forked arms 10, to be hereinafter more fully described.

One extremity of each of the connecting links 11, is formed at right angles to the body portion thereof and adapted to extend through an opening formed in the upper end of the forked arm 10 to which the same is applied, a suitable cotter pin 15 being applied to secure the connecting links 11 to their respective forked arms.

Supported within the bearings 16, which are carried by the frame of the machine, is a power shaft 17 which supports the power pulley 18 on one end thereof, and this shaft is also provided with a plurality of cranks 19, which have connection with the forked arms, at points substantially intermediate the lengths thereof.

The adjustable crank arm 14, has one of its ends supported in the bearing 20, the opposite end thereof being supported in the bearing 21, and as shown, one end of this arm 14 is formed into a controlling handle 22, by means of which the crank arm 14 may be adjusted to predetermined positions, to change the throw of the forked arms 10.

Formed in the bearing 21, is a suitable threaded opening, adapted to receive the securing bolt 23 which is of a length to contact with the crank arm 14 to accomplish the securing of the crank arm 14 in its positions of adjustment, thus insuring the crank arm 14 and cranks 19 being maintained in proper operative relation with each other at all times. Disposed on the lower end of each of the arms 10 is the usual fork 24 which operate in close proximity with the racks 8 to cause the straw to be forcibly moved over the racks to cause the grain to become freed therefrom.

From the foregoing, it is obvious that if it is desired to change the throw of the forked arms, to cause the same to operate with greater sweeps, it is only necessary to move the adjustable crank arm 14 in a manner as described, to a predetermined position, whereupon the securing bolt 23 is positioned to secure the crank arm 14 in such position of adjustment.

It is believed that in view of the above specification, a detail operation of the device, step by step, is unnecessary for a complete understanding of the invention.

I claim:

1. In a threshing machine, a body, inclined racks supported within the body, forked arms coöperating with the inclined grates, a power shaft having connection with the forked arms, an adjustable arm having a plurality of cranks formed thereon, the throws of the crank being in the same direction, connecting links for connecting the cranks and forked arms, a handle formed at one end of the adjustable arm for moving the forked arms within the body, and means for securing the adjustable arm in its positions of adjustment.

2. In a threshing machine, a body, grates supported within the body, forked arms operating within the body, a power shaft having connection with the forked arms for moving the same, an adjustable crank arm having throws extending in the same direction, bearings for supporting the adjustable crank arm, one of said bearings having a threaded opening, a securing bolt operating in the threaded opening and adapted to engage the adjustable crank arm for securing the crank arm in its positions of adjustment, and a handle formed at one end of the adjustable crank arm.

OTTO STEINBORN.